June 26, 1923.
H. FIFER
RIM CONSTRICTING AND EXPANDING DEVICE
Filed Feb. 18, 1922
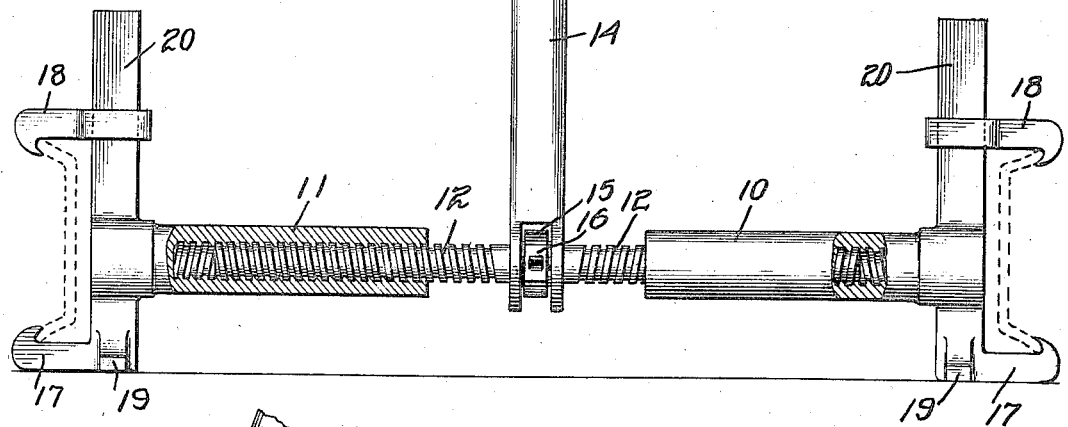
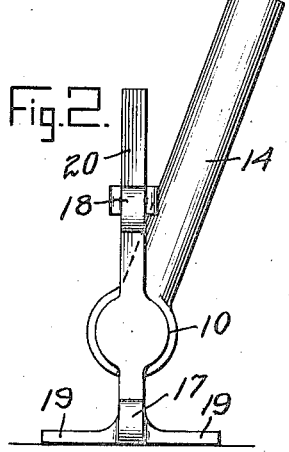 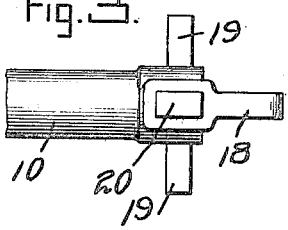 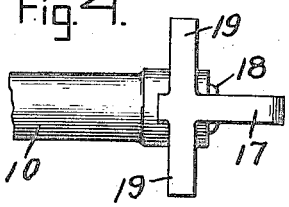
Inventor
Harvey Fifer
By
Attorney Patented June 26, 1923.

1,460,319

UNITED STATES PATENT OFFICE.

HARVEY FIFER, OF DEER LODGE, MONTANA.

RIM CONSTRICTING AND EXPANDING DEVICE.

Application filed February 18, 1922. Serial No. 537,574.

*To all whom it may concern:*

Be it known that I, HARVEY FIFER, a citizen of the United States, residing at Deer Lodge, in the county of Powell and State of Montana, have invented certain new and useful Improvements in Rim Constricting and Expanding Devices, of which the following is a specification.

This invention relates to devices for constricting demountable automobile rims to allow the ready removal of the tire, and for expanding a rim to effect a perfect seating of the tire. It is a purpose of the invention to provide a device which is of simple construction and easily operated in one direction to effect a constriction of the rim and in another direction to expand the same.

Referring to the accompanying drawings which form a part hereof and on which similar reference characters indicate similar parts:

Figure 1 is a view of the device in side elevation showing in dotted line the position relative to the rim.

Figure 2 is an end view of the device taken from the elevated end of Figure 1.

Figure 3 is a plan view of either end of the device.

Figure 4 is an inverted plan view of either end of the device.

The majority of demountable automobile rims are so constructed that in order to remove a tire it is first necessary to constrict said rim sufficiently to allow the tire to be removed from the rim seat. When the tire is replaced about the rim seat it is then necessary to expand said rim to normal position to effect perfect seating of the tire.

The present invention consists of two internally threaded barrels 10—11 each provided with a hook 17 and an adjustable clamp 18 to engage the rim on diametrically opposite sides. The barrels 10—11 are provided with a screw 12 to which power is applied in any approved manner, as by means of a lever 14 and preferably, though not necessarily, a ratchet 15, and pawl 16. The screw at one end is provided with a right hand thread and at the other end with a left hand thread by which means the barrels 10—11 are brought together when the screw 12 is turned in one direction and are forced apart when the screw is turned in the opposite direction. The barrels, 10—11 are provided on the outer ends with a cross bar having stationary hook 17 on one end and an adjustable clamp 18 on the other end. The cross bars 20 are provided with a base 19 which holds the device in an upright and proper position.

In operation the device is positioned about a rim shown by dotted lines in Figure 1 with the hooks 17—18 properly positioned on diametrically opposite outer points on the rim. The movement of lever 14, in one direction, then serves to constrict the rim, such action being continued until the rim is sufficiently constricted to allow easy removal of the tire. After replacing the tire on the rim, by rotating the screw 12 in the opposite direction, the barrels 10—11 are forced apart and the opposite ends are brought in contact with inner diametrically opposite points on the rim. This serves to expand the rim, such action being continued until the rim is expanded to normal position and perfect seating of the tire is obtained. The adjustable hooks or clamps 18 are then removed from the cross bars 20 and the tire and rim lifted free from the device.

Having thus fully described my said invention, what I claim as new and desire to secure by Letters Patent is:

1. A device for constricting and expanding demountable automobile rims comprising a pair of bars each having a base adapted to support it in upright position, a fixed lower gripper on each bar adapted to engage the lower edge of a recumbent rim, gravity operated grippers slidably mounted on the bars to engage the upper edge of the rim, and means for moving the bars toward and from each other, substantially as set forth.

2. A device for constricting and expanding demountable automobile rims comprising a pair of oppositely extending internally threaded barrels, a cross bar formed at the outer extremity of each barrel and at right angles therewith, said cross bar having an upper portion and a lower portion formed with an outwardly extending integral hook adapted to engage one edge of the rim and also having a pair of oppositely extending portions integral with the cross bar and adapted to form a base to support the device in operable position, a hook slidably mounted upon the said upper portion of the cross bar for engagement with the other edge of the rim, a screw for engagement with the threads of the said barrels, and means for rotating the screw to move the barrels inwardly or outwardly, substantially as set forth.

In witness whereof, I have hereunto set my hand and seal at Deer Lodge, Powell County, Montana, this 10th day of January 1922.

HARVEY FIFER [L. S.]

Witnesses:
S. P. WILSON,
P. M. JONES.